Jan. 23, 1934.  J. TRACY  1,944,334
APPARATUS FOR MAKING ACCURATE DYNAMOMETRIC DETERMINATIONS
Filed Dec. 16, 1927   3 Sheets-Sheet 1
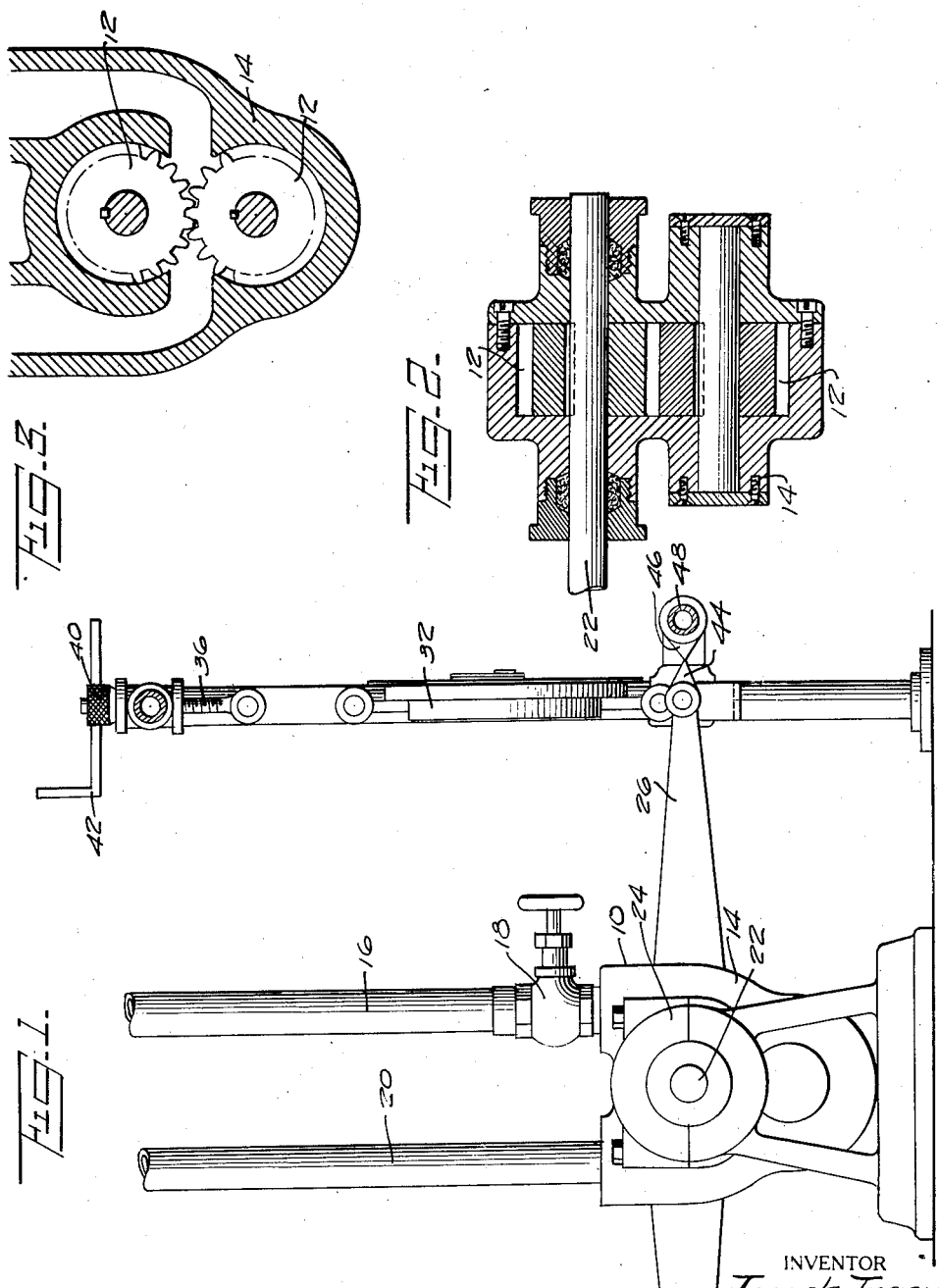

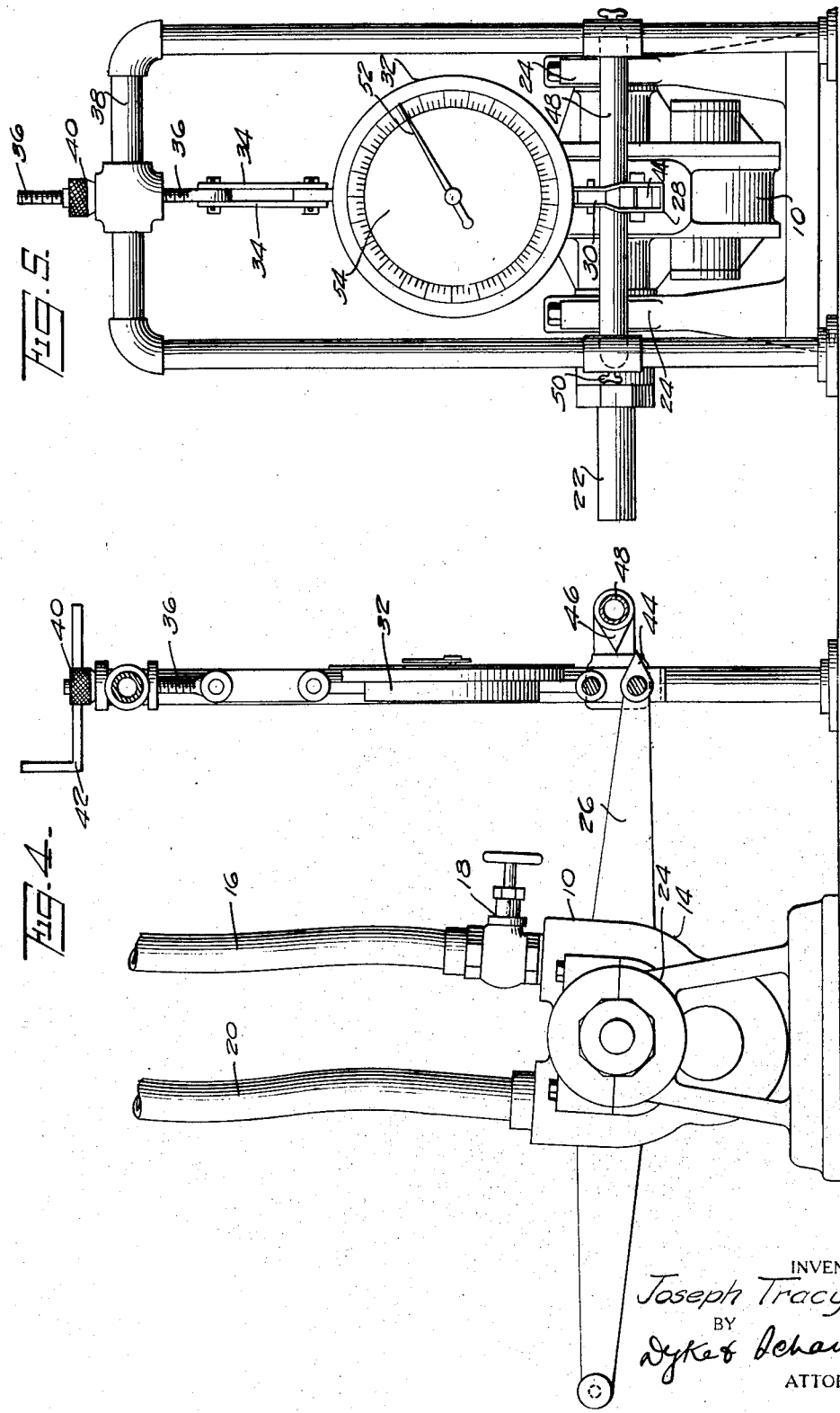

Jan. 23, 1934.     J. TRACY     1,944,334
APPARATUS FOR MAKING ACCURATE DYNAMOMETRIC DETERMINATIONS
Filed Dec. 16, 1927     3 Sheets-Sheet 3
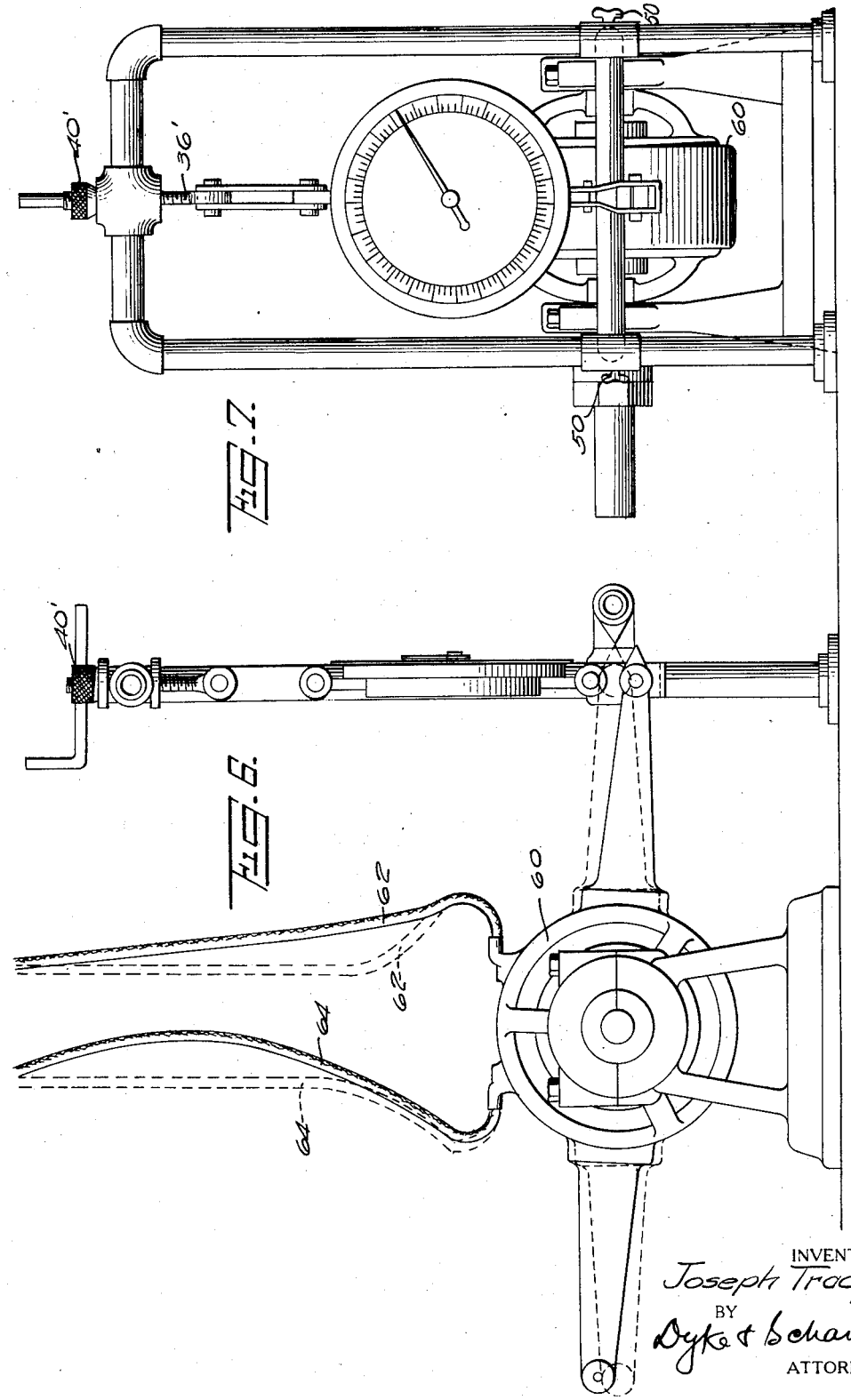
INVENTOR
Joseph Tracy
BY
Dyke & Schanze
ATTORNEYS.

Patented Jan. 23, 1934

1,944,334

UNITED STATES PATENT OFFICE 1,944,334

APPPARATUS FOR MAKING ACCURATE DYNAMOMETRIC DETERMINATIONS

Joseph Tracy, Rutherford, N. J.

Application December 16, 1927
Serial No. 240,420

1 Claim. (Cl. 265—24)

My invention relates to an apparatus for making accurate dynamometrical determinations.

It is a great advantage in many kinds of work which are carried on by the aid of a dynamometer, as, for example, the adjusting of the fuel feeding and ignition devices of internal combustion engines, to be able to observe at a distance the indicated torque. This may be done by means of a spring balance connected to the torque arm of the dynamometer. However, such an arrangement has the disadvantage that the torque arm of the dynamometer brake moves through a relatively long swing from its initial or zero position to the position at which the scale reading is desired. When this occurs and the braking apparatus, as, for example, a water brake or an electrical brake, is swung through a relatively large angle in turning from initial position to the position for measurement of torque, factors other than the pull on the scale affect the movement of the brake and its torque arm and introduce error into the torque scale reading so obtained, as, for example the scale reading may be materially reduced by the force required for the overcoming of the frictional resistance which opposes the movement of the torque arm and also by the force required for the bending of the hose connections of a fluid brake or of the electrical cables of an electrical brake, etc. An additional source of error arises from the fact that when the brake arm moves from its horizontal position its projection upon a horizontal plane is shortened by reason of the fact that its path is the arc of a circle. The greater the angular movement of the brake arm the shorter its projection becomes and the shorter its effective leverage with respect to the spring balance.

My invention has for its object the eliminating of error arising from causes such as above referred to and the obtaining of accurate torque measurements when using scales, such as the spring balance, which normally involve a relatively large swing of the braking apparatus.

According to a preferred embodiment of the apparatus of my invention, means are provided for restoring the braking device to original position while exerting its pull on the scale, and for indicating such original position, thereby eliminating sources of error due to swing of the braking apparatus and torque arm. Thus, for example, I may suspend the spring balance to which the dynamometer torque arm is attached from a support, so that it can be raised and lowered, as by means of a screw and may provide the support and the torque arm with co-operating indicator points which register with each other when the torque is zero and the spring balance indicates zero. With such arrangement when the engine or other power apparatus is running and operating the dynamometer, the spring balance may be raised until the torque arm and the brake device to which it is attached are restored to the noted initial or zero position. Torque measurements so obtained by difference in scale readings are free from error due to swing of the torque arm which has been avoided, and with use of such apparatus, torque determinations can be made with as great or greater accuracy than with a beam scale. The invention may also be made use of with beam or similar scales, if desired, particularly where extreme accuracy is wanted.

The accompanying drawings illustrate the application of my invention to fluid brake and electrical brake dynamometers and are intended to illustrate the principle without limitation of the invention, which is of the scope defined by my claim.

In said drawings, Fig. 1 is a side view of a fluid dynamometer and spring balance. Figs. 2 and 3 are details showing the interior construction of a fluid brake. Fig. 4 is a view similar to Fig. 1 with the fluid brake and torque arm turned through a substantial angle, and Fig. 5 is a face view looking at the right of Fig. 4. Figs. 6 and 7 are side and face views of an electrical dynamometer used with an adjustably supported spring scale, the full and dotted lines respectively of Fig. 6 indicating turned and unturned positions of the electric brake mechanism and attached torque arms and cables.

The fluid brake 10 illustrated in Figs. 1–5 is of the gear pump type comprising spur gears 12, 12 turning in a casing 14, the fluid running to a cooler (not shown) through the flexible outlet conduit 16 controlled by valve 18 and back through the hose 20. The engine or other power device is connected to the shaft 22 of the upper gear, and the casing oscillates on the same axial line, being supported in bearings 24.

Torque arm 26, secured to the pump casing 14, is connected by the links 28 to the weight support 30 of a spring balance 32. The spring balance 32 is supported by links 34 and screw 36 from the frame 38, and the nut 40 for screw 36 is manually turned by the crank 42. Torque arm 26 carries an indicator point 44 and the frame 38 also carries the adjustable indicator point 46. Point 46 may, for example, be mounted on the slide bar 48, which can be clamped to the side members of frame 38, as by means of the wing nuts 50.

Point 46 is initially set opposite the torque arm point 44 (see Fig. 1). When power is applied and valve 18 adjusted, the fluid brake 10 and its torque arm 26 will be turned through an angle, as, for example, to the position of Fig. 4, the spring balance yielding and its hand 52 being turned with respect to the dial 54. It will be seen that in such position the flexible conduits 16 and 20 are bent aside, and there is no way to know to what extent these and other factors interfere with getting an accurate scale reading for torque.

By turning the crank 42 and nut 40, the spring balance is raised until the torque arm indicator point 44 again registers with the frame point 46, and the brake and torque arms are thus restored to initial position free from interference by outside factors, such as the bending aside of flexible conduits and the like, and an accurate torque scale reading can be made.

The described operation will apply to brakes of various kinds. Thus the electric dynamometer 60 of Figs. 6 and 7, in being turned from the dotted to the full line position of Fig. 6 carries with it other parts, such as the cables 62, 64, and by restoring the brake 60 and associated parts to initial position (dotted line position) by means of screw 36' and nut 40' before making the scale reading for torque, an accurate determination can be made.

I claim:

In a dynamometer, the combination of a braking member, an arm rigid therewith, a spring balance comprising a body and an extensible member, a connection between said arm and said extensible member, a fixed support, co-operating indicating means on said fixed support and said braking member, and a screw threaded adjustable connection between said fixed support and said spring balance body.

JOSEPH TRACY.